United States Patent Office 3,827,912
Patented Aug. 6, 1974

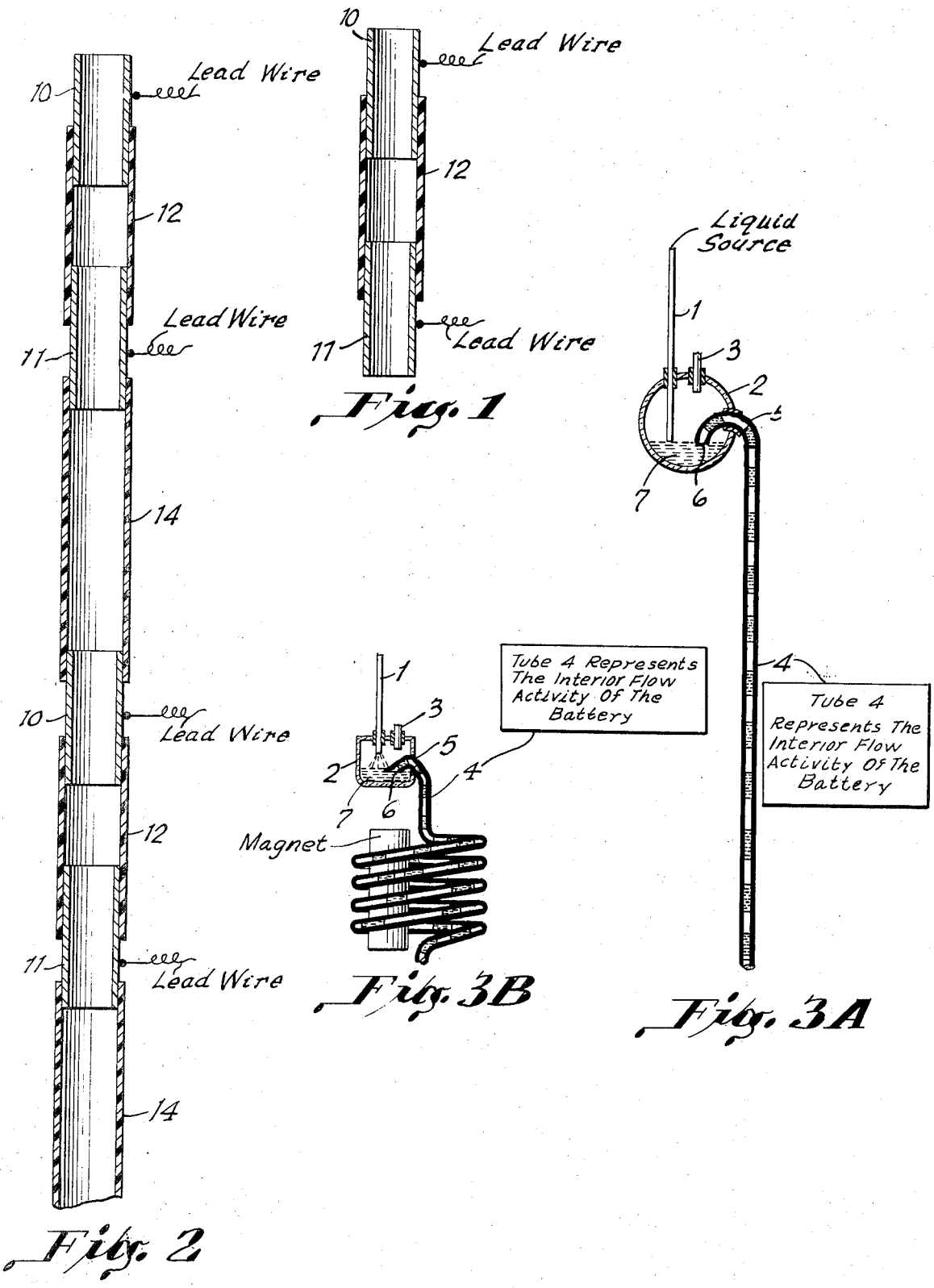

---

3,827,912
MAGNETOPOLYPILE TUBULAR BATTERY AND METHOD OF MAKING SAME
Donald S. Justice, 1816 N. Queens Lane,
Arlington, Va. 22201
Filed Mar. 30, 1971, Ser. No. 129,347
Int. Cl. H01m 1/00
U.S. Cl. 136—83 R                12 Claims

ABSTRACT OF THE DISCLOSURE

A three-sixteenths inch inside diameter tube of one-half inch length suitable as an anode and a tubular cathode of the same dimension are joined by tubular insulation to form an electric cell. These cells are similarly joined to form a battery. The battery may be electrically connected to increase its voltage and amperage so that a 3 foot battery would be very slim and a 8 inch diameter cylinder would house well over 100 such batteries. In this method and at light weight a quick and conservative experimental instrument is at hand for eventual use as a power pack in an electric car.

---

This invention relates to making electric cell methods using tubular material adapted to flow an electrolyte through the tube and particularly when a number of such cells are joined in making an electric battery in the form of a slender composite tube.

In accordance with the present invention an anode conduit and a cathode conduit have a short insulating tube joining them into a composite conduit in which a flowable electrolyte may gravitate during a vertical arrangement of the longitudinal axis. While no restriction as to use is contemplated, the principal use of the invention is for furnishing electricity to power an electric automobile, but more particularly to furnish a many faceted educational basis for experimenting with producing a voltage for any fitting use or application.

According to a feature of the invention, an intermittent syphon means can be in the various combinations in which slugs of electrolyte alternate with slugs of gas flowing through the conduit. This is a well known arrangement which may design the length of liquid slugs to include the entire length of a flow conduit. Furthermore the alternating slugs may form an on and off electric switch, but otherwise limit the amount of liquid lifted for reflow to one-half the amount in conduit flow since the downward inclusion of gas is at atmospheric pressure.

According to a further feature of the invention the conduit battery may flow a mixture of gases including a fuel for chemical action enhancing the production of electricity. Relative motion between a magnetic field and a cell or other conductor may be achieved by configurating the conduit similar to a coil and thereby multiply the intercepting lines of magnetic force.

The various features of the invention may be understood by referring to the drawing in which:

FIG. 1 shows an illustrative embodiment of the invention;

FIG. 2 shows combinations of FIG. 1; and

FIG. 3A shows means for causing intermittent flow in the conduit and FIG. 3B shows a coil configuration of a syphon tube about a magnet.

In the drawing reference character 10 designates a tubular anode having a wire lead which may be soldered or otherwise connected for electrical communication. Reference character 11 designates a tubular shaped cathode which is likewise equipped with a wire lead. These two terminals are joined by insulating material in a manner to have continuity of the conduit and thus form a composite tube which, with electrolyte therein, is an electric cell. The insulating portion 12 may have an inside diameter equal to the outside diameter of the anode and cathode and be of the same length. In this form the terminals may slide into the insulating section and be sealed with cement or otherwise fixed so as to leave a space between the anode and cathode. Without size restriction the uniformity of electrolyte slugs is best served in capillary tube diameter, and thus the composite tube operates best in less than one-quarter inch inside diameter.

Specifically referring to FIG. 2 the 10, 11, and 12 composite tubular cells are joined together by a longer section of insulation tube 14 to form a tubular battery. Such a battery is subject to the well known manner of being connected electrically such as series, parallel, and series-parallel. The insulation section 14 is of any suitable material such as glass, plastic, or rubber and may be joined by molding, cementing, or otherwise. Section 14 is of greater length than the short insulator between the anode and cathode of a tubular cell. In the battery operation this will insure that a slug of gas, at least in part, will be in section 14 between two cells forming a moving brake in electrical communication.

The nature of the electrolyte may vary and also the nature of the materials used for anode and cathode may vary. When sections 10 and 11 are taken from the electromotive force series of metals the various considerations in practicality may be the guide. For example, in a short life anticipation for a cell in experimental use, a copper anode and an aluminum cathode may serve with sea water as an electrolyte. The extreme corrosive effects will soon impair the operation i.e. a metal section may be consumed. The materials are available and inexpensive. One-quarter inch copper and aluminum tubes are common and may be cut to one-half inch lengths. Dilute sulfuric acid may be used with lead for anode and cathode as described by Professor W. Watson, A Text Book of Physics, 1900, London, Longmans Green & Co. The accouterments for recharging and the materials used in the so-called storage battery may be used in this invention. It is not intended to restrict materials in any way and consequently, a wide range of experiments can be performed quickly with this invention. The saving of space, the change in the shape of space requirements, the saving in weight, time, money, and manufacturing expedience make this invention practical for use determinations relative to the electric car.

Referring now to FIG. 3A there is shown a typical means of dividing a flow of electrolyte through a capillary tube into alternating slugs of liquid and gas. By using the syphon a positive displacement of fluctuating amounts is achieved. FIG. 3B is distinguished from FIG. 3A only in that the syphon flow tube is configurated as a coil. Reference numeral 1 designates a passageway for electrolyte to enter container 2 by gravitational force and collect as at 7. Numeral 3 is a gas passageway which will admit the atmosphere for forming gaseous slugs. Syphon tube 4 represents the interior flow activity of the battery shown in FIG. 2 and the flow is shown by gravity although this may be otherwise arranged. In order to be self priming the syphon tube 4 has a syphon bend 5 at its uppermost part and an open end 6. The passageway sizes are relative and it is clear that electrolyte may enter through 3 and gas may enter through 1 whereupon the slugs of liquid in tube 4 would have a longer design as tube 3 is larger than tube 1. It is also clear that any type of gas, including fuel gas, may be delivered through tube 1 or 3 and that such tube may be a catalyst carrier. One type of a catalyst carrier is made by a tubular section of 1 or 3 wherein a bonding agent is applied to the tube interior. Metallic leaf, such as palladium leaf, is applied to the bonding agent at the proper degree of hardening, but the leaf is not then covered over with a coat of the agent. In this way the tube interior surface is metal coated and the entering gas will pass over it for catalytic action. It is also contemplated that the electrolyte (with or without gas) may be recirculated by providing a collector at the base of a battery tube or tubes, a pump to lift material to a container above the battery, and feed connections in the container for tube 1 or 3. Where water is formed in flow through the battery an overflow can be provided with ordinary skill and, for this reason, the recirculation and an overflow pipe are not shown.

The foregoing detailed description of an illustrative embodiment of the invention has been given only for purposes of illustration and the true scope of the invention is to be determined from the appended claims.

I claim:

1. In a battery, a current generating electric cell of tubular material comprising a cathode metal of hollow tubular configuration, separation insulation of hollow tubular configuration, an anode metal different from said cathode metal of hollow tubular configuration, joining means for supporting said insulation between the cathode and anode in a composite tube, cathode and anode leads for electric communication, and separate means for flowing alternate dissimilar material as slugs of electrolyte and gas through the composite tube.

2. In a battery of cells as in claim 1 a second insulation separator of hollow tubular configuration joining cells one to another.

3. The battery of claim 2 wherein the cells are electrically connected by wire.

4. The battery of claim 3 wherein the battery is configurated into a coil around a magnet for multiple interception of lines of magnetic force.

5. The battery of claim 4 including a pump for recirculating the fluid material.

6. The battery of claim 5 wherein said dissimilar slugs form an on and off electric switch.

7. A tubular current generating cell comprising: a tubular anode, a tubular cathode of dissimilar conductive materials, a tubular insulator joining said anode and cathode, electrolyte within said anode, cathode and insulator, means for connecting said cell to a load, and a peripheral portion of said anode and said cathode being exposed to the atmosphere.

8. The tubular current generating cell of claim 7 including means for circulating electrolyte through said cell.

9. A tubular battery comprising: a plurality of tubular current generating cells as in claim 8 wherein a second tubular insulator joins said cells.

10. The battery of claim 9 including means for circulating electrolyte through said battery.

11. The battery of claim 10 formed into a coil which completes an electric circuit thereby producing a magnetic field.

12. The method of making a multicell electric battery of tubular material which comprises forming a hollow composite conduit by joining a tubular anode section of one conductive composition to one end of a separator insulator tubular section, joining a tubular conductive composition cathode section different from that of said anode section to the other end of the separator insulating section, connecting into the composite conduit a separate means for producing a flow of alternate segments of electrolyte and gaseous fluids through the composite conduit, joining cells with a hollow tubular insulating section to form a battery, electrically connecting the cells with wire, forming the battery into a coil about a magnet for fluid flow so as to cause multiple interception of the lines of magnetic force, and installing a pump for circulating the alternating segments flow so as to cause an on and off electric switch.

References Cited

UNITED STATES PATENTS

| | | | |
|---|---|---|---|
| 3,216,911 | 11/1965 | Kronenberg | 136—86 R |
| 3,227,585 | 1/1966 | Langford et al. | 136—86 E |
| 3,297,485 | 1/1967 | Tocker | 136—86 R |
| 3,311,504 | 3/1967 | Johnson | 136—86 R |
| 3,514,335 | 5/1970 | Grubb | 136—86 R |
| 3,099,131 | 7/1963 | Rosa | 310—11 |
| 3,120,621 | 2/1964 | Gunther et al. | 310—11 |
| 3,176,166 | 3/1965 | Gunther et al. | 310—11 |
| 3,322,978 | 5/1967 | Lary et al. | 310—4 |
| 3,453,462 | 7/1969 | Hsu et al. | 310—11 |
| 3,051,631 | 8/1962 | Harbin et al. | 204—1.1 |
| 2,076,422 | 4/1937 | Zimmerer | 204—196 |

FOREIGN PATENTS

| | | | |
|---|---|---|---|
| 1,504,536 | 10/1967 | France | 136—107 |

OTHER REFERENCES

Electronics and Power, August 1964, p. 258, Magnetohydrodynamic Power Generation.

Transactions of the ASME, October 1961, pp. 392–394, The Significance of the Hall Effect for Three MHD Generator.

ALLEN B. CURTIS, Primary Examiner

H. A. FEELEY, Assistant Examiner

U.S. Cl. X.R.

310—2, 11; 335—29